(12) United States Patent
Yamaoka et al.

(10) Patent No.: US 12,309,147 B2
(45) Date of Patent: May 20, 2025

(54) AUTHENTICATION METHOD, AUTHENTICATION SYSTEM, AND AUTHENTICATION SERVER

(71) Applicant: WOVEN BY TOYOTA, INC., Tokyo (JP)

(72) Inventors: Masaaki Yamaoka, Tokyo-to (JP); Yasutomo Masuda, Tokyo-to (JP); Hiroko Okuyama, Tokyo-to (JP); Takahiro Suzuki, Tokyo-to (JP); Hideo Hasegawa, Tokyo-to (JP)

(73) Assignee: WOVEN BY TOYOTA, INC., Tokyo (JP)

( * ) Notice: Subject to any disclaimer, the term of this patent is extended or adjusted under 35 U.S.C. 154(b) by 185 days.

(21) Appl. No.: 17/945,745

(22) Filed: Sep. 15, 2022

(65) Prior Publication Data
US 2023/0083802 A1  Mar. 16, 2023

(30) Foreign Application Priority Data
Sep. 16, 2021  (JP) .................... 2021-151456

(51) Int. Cl.
*H04L 9/40* (2022.01)
*G06Q 10/02* (2012.01)
*G06Q 50/10* (2012.01)

(52) U.S. Cl.
CPC ......... *H04L 63/0869* (2013.01); *G06Q 10/02* (2013.01); *G06Q 50/10* (2013.01); *H04L 63/102* (2013.01); *H04L 63/126* (2013.01)

(58) Field of Classification Search
None
See application file for complete search history.

(56) References Cited

U.S. PATENT DOCUMENTS

| | | | |
|---|---|---|---|
| 10,899,235 B2* | 1/2021 | Forbes, Jr. | G06Q 50/06 |
| 2008/0140570 A1* | 6/2008 | Vaughn | G06Q 10/02 |
| | | | 705/50 |

(Continued)

FOREIGN PATENT DOCUMENTS

| | | |
|---|---|---|
| JP | 2005-84960 A | 3/2005 |
| JP | 2007-133522 A | 5/2007 |

(Continued)

*Primary Examiner* — Philip J Chea
*Assistant Examiner* — James Ross Hollister
(74) *Attorney, Agent, or Firm* — Sughrue Mion, PLLC

(57) ABSTRACT

The present disclosure provides a technique that enables a customer who intend to receive a service and an attendant in charge of the customer to verify each other's authenticity. An authentication method of the present disclosure comprises transmitting a trigger signal from the customer terminal to the server, transmitting first identification information to the customer terminal, and displaying the first identification information on the customer terminal. The authentication method of the present disclosure also comprises accepting input of second identification information into the attendant terminal, transmitting the second identification information from the attendant terminal to the server, collating the second identification information transmitted from the attendant terminal with the first identification information transmitted to the customer terminal, and transmitting authentication notice to the customer terminal and the attendant terminal in response to equality between the first identification information and the second identification information.

9 Claims, 3 Drawing Sheets

(56) References Cited

U.S. PATENT DOCUMENTS

| | | | |
|---|---|---|---|
| 2016/0078689 A1* | 3/2016 | Cheng | G06Q 50/40 |
| | | | 705/13 |
| 2016/0133133 A1* | 5/2016 | Triplett | H04W 4/023 |
| | | | 340/932.2 |
| 2018/0102017 A1* | 4/2018 | Brinig | G07F 17/0057 |
| 2018/0290628 A1* | 10/2018 | Luke | G07C 9/30 |
| 2019/0273826 A1* | 9/2019 | Warrick | H04M 15/7556 |
| 2019/0392543 A1* | 12/2019 | Bautista | H04W 12/03 |
| 2020/0105140 A1* | 4/2020 | Wang | G06Q 20/127 |
| 2021/0110714 A1 | 4/2021 | Maruiwa | |
| 2022/0089123 A1* | 3/2022 | DeLong | H04L 63/0846 |
| 2022/0089124 A1* | 3/2022 | DeLong | B60R 25/31 |

FOREIGN PATENT DOCUMENTS

| | | |
|---|---|---|
| JP | 2018-041381 A | 3/2018 |
| JP | 2020-38443 A | 3/2020 |
| JP | 2021-064117 A | 4/2021 |

\* cited by examiner

AUTHENTICATION METHOD, AUTHENTICATION SYSTEM, AND AUTHENTICATION SERVER

CROSS-REFERENCE TO RELATED APPLICATION

The present application claims priority under 35 U.S.C. § 119 to Japanese Patent Application No. 2021-151456, filed Sep. 16, 2021, the contents of which application are incorporated herein by reference in their entirety.

BACKGROUND

Field

The present disclosure relates to an authentication method, an authentication system, and an authentication server.

Background Art

JP2021-064117A discloses an example of a technique relating to automated valet parking of a self-driving vehicle. According to the technique disclosed by JP2021-064117A, an authentication code is transmitted to a user who reserves entry to a parking place and when check-in using the authentication code is performed in the parking place, instructions for automated valet parking of the self-driving vehicle begin. In this case, by considering relationship among a position of a reservation target vehicle, current time, and expected entry time, security of transmitting the authentication code is improved.

By the way, valet parking is not limited to the automated valet parking disclosed by JP2021-064117A. Manual valet parking where an attendant makes the vehicle deposited by a customer enter/leave the parking place is also widespread. In this description, when simply referred to valet parking, it means manual valet parking. In valet parking, the customer deposits the vehicle with the attendant waiting at a getting in/out place at the time of entry, and the attendant returns the vehicle to the customer in response to the request from the customer at the time of leaving.

However, it is not always true that an attendant with whom the customer intends to deposit the vehicle at the time of entry is an authentic attendant. Also, it is not always true that a customer to whom the attendant intends to return the vehicle at the time of leaving is an authentic customer. The issue of verifying the authenticity of the other person is not only a problem in valet parking, but also a problem that can widely occur between a customer who intends to receive a service and an attendant in charge of the customer.

Incidentally, JP 2007-133522A and JP 2018-041381A are exemplified in addition to the above JP 2021-064117 A as documents showing the technical level in the technical field of the present disclosure at the time of applying.

SUMMARY

The present disclosure has been made in view of the above-described problems. The present disclosure provides a technique that enables a customer who intend to receive a service and an attendant in charge of the customer to verify each other's authenticity.

The present disclosure provides an authentication method. The authentication method of the present disclosure is a method for authenticating a customer who intends to receive a service and an attendant in charge of the customer using a server configured to communicate with a customer terminal possessed by the customer and with an attendant terminal possessed by the attendant.

The authentication method of the present disclosure includes the following steps. The first step is transmitting a trigger signal from the customer terminal to the server. The second step is transmitting first identification information from the server to the customer terminal in response to transmission of the trigger signal from the customer terminal. The third step is displaying the first identification information transmitted from the server on the customer terminal. The fourth step is accepting input of second identification information into the attendant terminal. The fifth step is transmitting the second identification information input into the attendant terminal from the attendant terminal to the server. The sixth step is collating the second identification information transmitted from the attendant terminal with the first identification information transmitted to the customer terminal. The seventh step is transmitting authentication notice to the customer terminal and the attendant terminal from the server in response to equality between the first identification information and the second identification information.

According to the authentication method of the present disclosure, when the same information as the first identification information displayed on the customer terminal is input into the attendant terminal as the second identification information, the authentication notice is transmitted to both the customer and the attendant. Therefore, the customer who intends to receive the service can verify whether an attendant who intends to take charge of the customer is an authentic attendant by the authentication notice. Also, the attendant who receives a request for the service can verify whether a customer of whom the attendant intends to take charge is an authentic customer by the authentication notice.

In the authentication method of the present disclosure, the attendant terminal may be a registered terminal which is vested with authority to access the server as the attendant. This prevents an outsider from using the first identification information to access the server even when the outsider illegally obtains the first identification information of the customer.

In the authentication method of the present disclosure, the authentication notice transmitted to the attendant terminal may include reservation information for the service registered by the customer in advance. This reduces a burden on the attendant in accessing the reservation information because the customer's reservation information is automatically transmitted together with the authentication notice.

Further, in the authentication method of the present disclosure, the service may be a service which involves temporary storage of the vehicle deposited by the customer, and the attendant may be an attendant who handles the vehicle when providing the service. In addition, the service may be a valet parking service.

Further, in the authentication method of the present disclosure, the first identification information may be a plurality of letters and numbers and a combination thereof which are randomly determined. The second identification information is a plurality of letters and numbers and a combination thereof which can be input arbitrarily. By using a plurality of letters and numbers and a combination thereof as identification information, errors in viewing a screen on the customer terminal or errors in inputting the information into the attendant terminal can be reduced.

The present disclosure provides an authentication server. The authentication server of the present disclosure is a server for authenticating a customer who intends to receive a service and an attendant in charge of the customer. The authentication server of the present disclosure comprises at least one memory storing at least one program and at least one processor coupled with the at least one memory.

The at least one program comprised by the authentication server of the present disclosure is configured to cause the at least one processor to execute the following processes. The first process is receiving a trigger signal from a customer terminal possessed by the customer: The second process is transmitting first identification information to the customer terminal in response to the trigger signal. The third process is receiving second identification information from an attendant terminal possessed by the attendant. The fourth process is collating the second identification information received from the attendant terminal with the first identification information transmitted to the customer terminal. The fifth process is transmitting authentication notice to the customer terminal and the attendant terminal in response to equality between the first identification information and the second identification information.

In addition, the present disclosure provides an authentication program. The authentication program of the present disclosure is a program for causing a computer to authenticate a customer who intends to receive a service and authenticate an attendant in charge of the customer. The authentication program of the present disclosure may be recorded on a computer-readable storage medium or may be provided via a network.

The authentication program of the present disclosure is configured to cause the computer to execute the following processes. The first process is receiving a trigger signal from a customer terminal possessed by the customer. The second process is transmitting first identification information to the customer terminal in response to the trigger signal. The third process is receiving second identification information from an attendant terminal. The fourth process is collating the second identification information received from the attendant terminal possessed by the attendant with the first identification information transmitted to the customer terminal. The fifth process is transmitting authentication notice to the customer terminal and the attendant terminal in response to equality between the first identification information and the second identification information.

According to the authentication server of the present disclosure and the authentication program of the present disclosure described above, the customer who intends to receive a service can verify whether an attendant who intends to take charge of the customer is an authentic attendant by the authentication notice. Also, the attendant who receives a request for the service can verify whether a customer of whom the attendant intends to take charge is an authentic customer by the authentication notice.

As described above, the present disclosure provides a technique that enables a customer who intend to receive a service and an attendant in charge of the customer to verify each other's authenticity.

DETAILED DESCRIPTION

Hereinafter, embodiments of the present disclosure are described with reference to the accompanying drawings. However, in embodiments described below, when a number like a number of a certain thing, quantity, amount, range, or the like of each element is referred to, the idea relating to the present disclosure is not limited to the number referred to, except when it is particularly clarified, or the number is clearly specified in principle. In addition, the structure and the like in the embodiments described below are not necessarily essential to the idea relating to the present disclosure, except when particularly clarified or explicitly specified in principle.

1. OVERVIEW OF AUTHENTICATION SYSTEM

Figure 1:
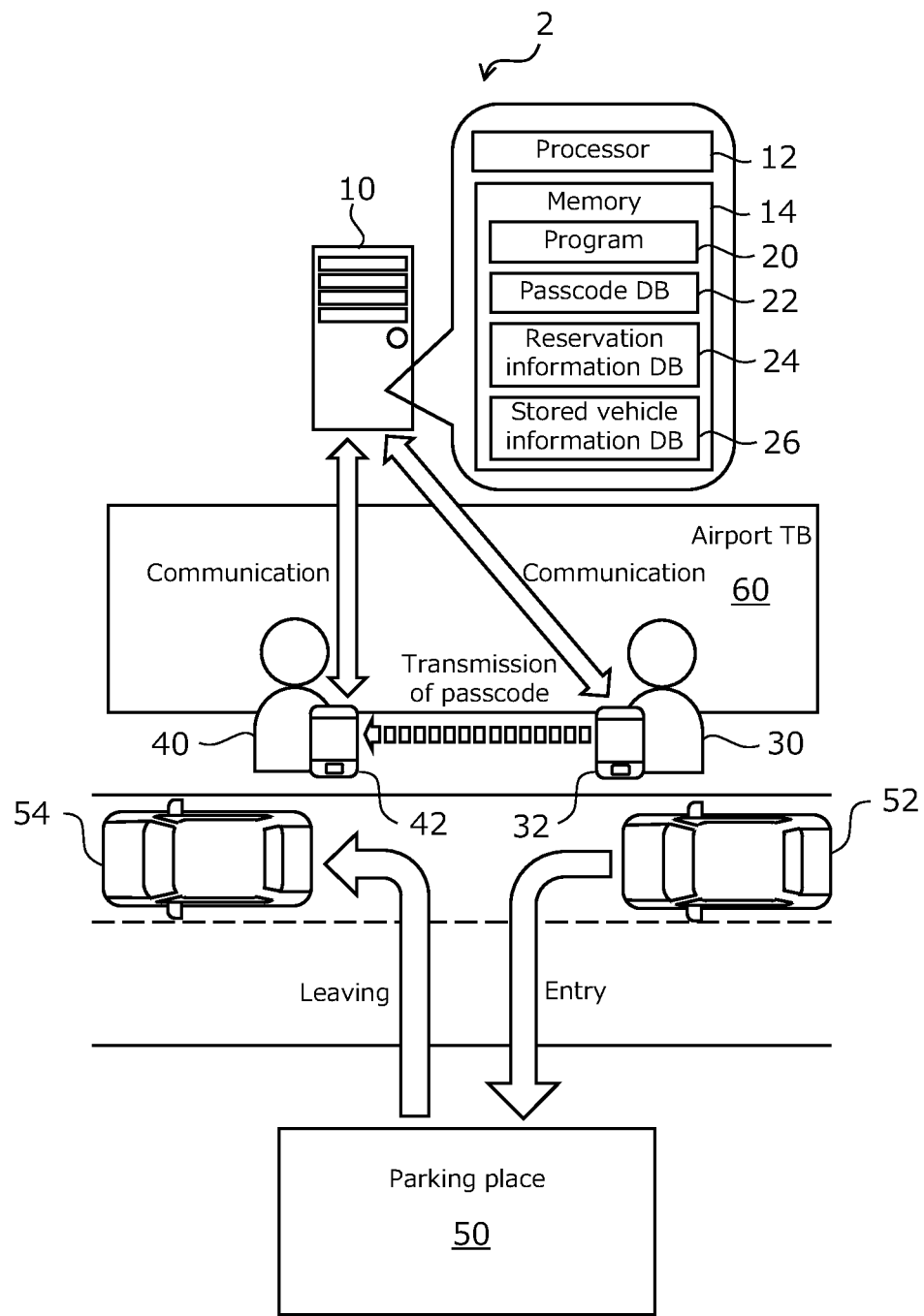
FIG. 1 is a diagram illustrating an outline of an authentication system applied to valet parking service according to the embodiment of the present disclosure.

The overview of an authentication system according to the present embodiment is described with reference to FIG. 1. The authentication system 2 according to the present embodiment is applied to valet parking service at an airport.

In the valet parking service at the airport, a vehicle 52 is deposited by a customer 30 with an attendant 40 at a getting out place in front of an airport terminal building (airport TB) 60. Also, a vehicle 54 is returned to a customer 30 by an attendant 40 at a getting in place in front of the airport TB 60. The customer 30 is a person who receives valet parking service. Typically, the customer 30 may be an airport user. The attendant 40 is a person in charge of the customer 30 to provide the valet parking service. The vehicle 52, which is deposited by the customer 30 with the attendant 40 at the getting out place, is made to enter a parking place 50 by the attendant 40 or a person in charge other than the attendant 40. Also, the vehicle 54, which is to be returned to the customer 30 by the attendant 40 at the getting in place, is made to leave the parking place 50 by the attendant 40 or a person in charge other than the attendant 40.

At the time of entry in the valet parking service, the customer 30 looks for the attendant 40 at the getting in/out place and deposits the vehicle 52 with the attendant 40. However, the attendant 40 is not always the only person at the getting in/out place. The customer 30 must avoid depositing the vehicle 52 with a person who is not the attendant 40. Therefore, it is the customer 30's crucial concern whether a person with whom the customer 30 intends to deposit the vehicle 52 is an authentic attendant 40 or not.

On the other hand, at the time of leaving in the valet parking service, the attendant 40 at the getting out place returns the vehicle 54 to the customer 30 in response to request from the customer 30. At this time, the attendant 40 must avoid returning the vehicle 54 to a person who is not the customer 30. Therefore, it is the attendant 40's crucial concern whether a person who requested to return the vehicle 54 is really the person to whom the vehicle 54 should be returned, that is, whether the person is the authentic customer 30.

The authentication system 2 is a system which enables the customer 30 and the attendant 40 to verify each other's authenticity. The authentication system 2 comprises an authentication server 10 on the Internet. The authentication system 2 is configured by connecting a customer terminal 32 possessed by the customer 30 and an attendant terminal 42 possessed by the attendant 40 to the authentication server 10.

The authentication server 10 comprises at least one processor 12 and at least one memory 14 coupled with the processor 12. The memory 14 stores at least one program 20 executable by the processor 12 and various data. The memory 14 includes a main storage device and an auxiliary storage device. The program 20 and the data may be stored in the main storage device or may be stored in a computer-readable storage medium including the auxiliary storage device.

The program 20 includes an authentication program. The authentication program includes an instruction which cause the authentication server 10 to performs an authentication method according to the present embodiment. When the authentication program is executed by the processor 12, the customer 30 and the attendant 40 is authenticated by the server 10. The process of the authentication method according to the present embodiment performed by the authentication server 10 is described below.

The data stored in the memory 14 includes data managed in a database. The database includes a passcode database 22, a reservation information database 24, and a stored vehicle information database 26 described below.

The passcode database 22 is a database which manages passcodes. The passcode is identification information to authenticate the customer 30 and the attendant 40. The passcode is typically a PIN consisting of a plurality of numbers. However, a password consisting of multiple letters or a combination of numbers and letters or an electronic code including a QR code (registered trademark) may be used as the passcode.

The reservation information database 24 is a database which manages reservation information of the valet parking service. The reservation information is information for the customer 30 to use the valet parking service conveniently. The reservation information includes information such as the customer ID, the time when the vehicle is deposited, the time when the vehicle is returned, the place where the vehicle is deposited, the place where the vehicle is returned, the desired service, and the like. However, the reservation is not necessarily required to use the valet parking service. Therefore, the reservation information is managed in the reservation information database 24 only when the reservation is made.

The stored vehicle information database 26 is a database which manages information of the vehicle stored in the parking place 50 by the valet parking service. The stored vehicle information is information to enable prompt return of the vehicle to the customer 30. The stored vehicle information includes information such as a registration number of the stored vehicle, customer ID of the customer 30 to which the vehicle is to be returned, a passcode, a storing place of the vehicle, returning time of the vehicle, a returning place of the vehicle, and the like. However, at least the time and the place where the vehicle is returned are not indispensable information as the stored vehicle information.

Each of the databases 22, 24, and 26 may be stored in an external storage device attached to the authentication server 10. Alternatively, the databases 22, 24, and 26 may be stored in a data server connected to the authentication server 10 via a network.

The customer terminal 32 and the attendant terminal 42 are used as a tool to verify authenticity mutually. The customer terminal 32 is a portable terminal capable of wireless communication, and a concrete example thereof is a smartphone. The customer terminal 32 is connected to the authentication server 10 on the Internet via a mobile network. A dedicated application for using the valet parking service is installed in the customer terminal 32. The dedicated application in the customer terminal 32, for example, can be obtained from a download service on the Internet with or without payment. Any portable terminal can be used as a customer terminal 32 when the dedicated application is installed in it. However, installing a dedicated application is not necessarily required for using a portable terminal as a customer terminal 32. In a case where a Web site for a valet parking service user is provided, by accessing the Web site with a portable terminal, the portable terminal can be used as a customer terminal 32.

The attendant terminal 42 is also a portable terminal capable of wireless communication and concrete examples thereof are a tablet and a smartphone. The attendant terminal 42 is connected to the authentication server 10 on the Internet via a mobile network. A dedicated application for providing the valet parking service is installed in the attendant terminal 42. However, not every portable terminal can be used as an attendant terminal 42 even when the dedicated application is installed in it. Only a registered terminal which is vested with authority to access the authentication server 10 as an attendant can be used as an attendant terminal 42. In the authentication server 10 or in the network for connecting with the authentication server 10, the MAC address of the attendant terminal 42 given permission to connect is registered.

As is described below, the authentication method according to the present embodiment requires the transmission of the passcode from the customer terminal 32 to the attendant terminal 42. However, communication between the customer terminal 32 and the attendant terminal 42 is not necessarily required. For example, when the passcode is a PIN, the passcode is transmitted by manually inputting the passcode displayed on the screen of the customer terminal 32 into the attendant terminal 42. Alternatively, when the passcode is a QR code, the passcode is transmitted by photographing the passcode displayed on the screen of the customer terminal 32 with a camera of the attendant terminal 42. In addition, when the passcode is transmitted via communication, standardized short-range wireless communication can be used.

Figure 2:
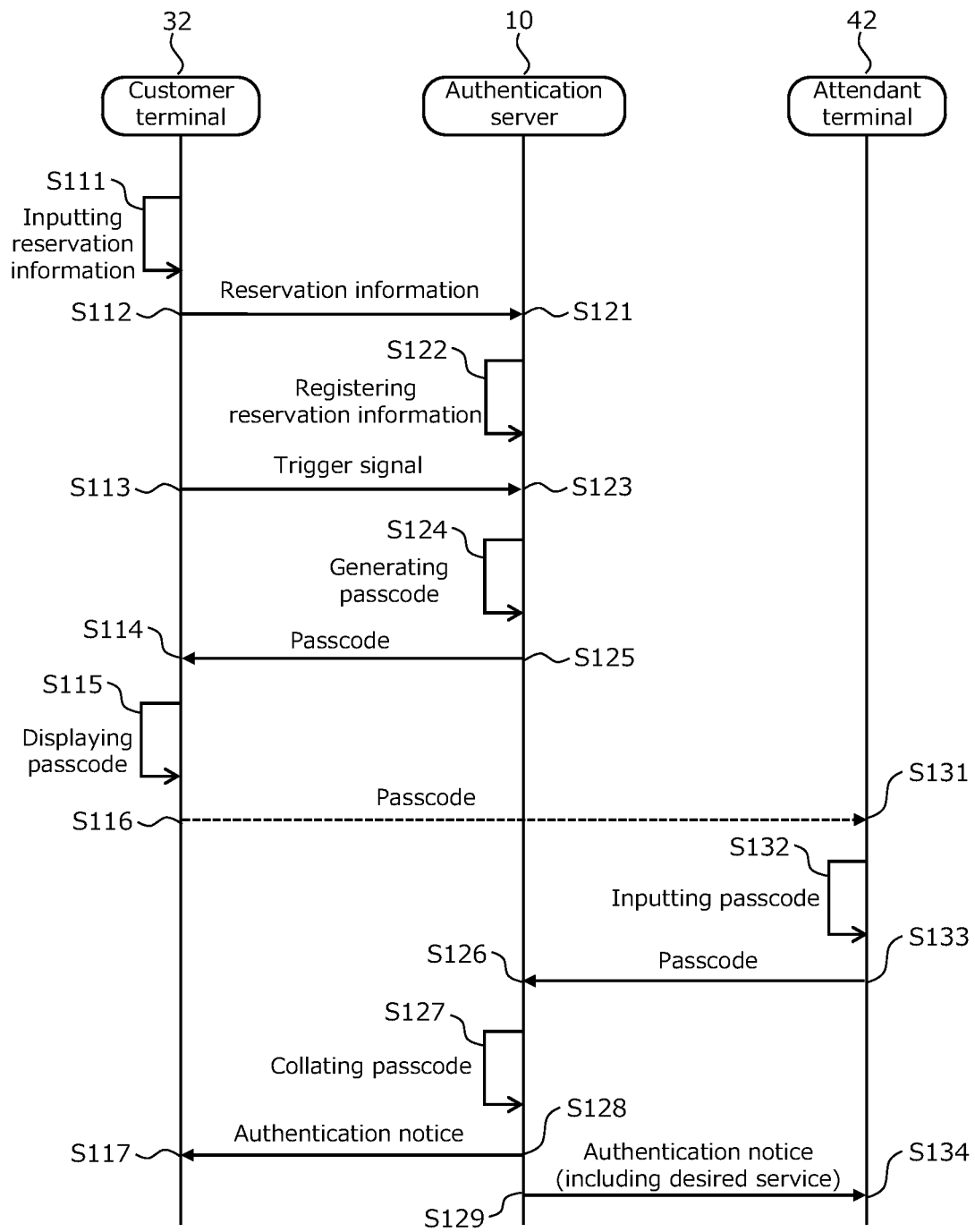
FIG. 2 is a flowchart illustrating a process of an authentication method performed at the time of entry of a vehicle by valet parking in the embodiment of the present disclosure.

2. PROCESS OF AUTHENTICATION METHOD 2-1. Process of Authentication Method by Valet Parking Performed at Time of Vehicle Entry FIG. 2 is a flow chart illustrating the process of the authentication method performed by the authentication system 2 at the time of the vehicle entry by the valet parking. The customer 30 who plans to use the valet parking inputs the reservation information into the customer terminal 32 as necessary (step S111).

If the time to deposit the vehicle is input as the reservation information, the attendant 40 is waiting at the getting out place at that time. In addition, by designating a place to deposit the vehicle, it is possible to deposit the vehicle with the attendant 40 at the place other than the getting out place. If the returning time and the returning place of the vehicle are input in advance, the attendant 40 makes the vehicle leave in advance and waits at the returning place at the time when the vehicle is returned by the valet parking. Further, the customer 30 can input the desired service as the reservation information. The desired service, which can be input, includes pay service which can be provided during the storage, such as refueling in the vehicle, washing the vehicle, and maintenance of the vehicle, for example.

The customer 30 operates the customer terminal 32 and transmits the reservation information from the customer terminal 32 to the authentication server 10 (step S112). The authentication server 10 receives the reservation information transmitted from the customer terminal 32 (step S121). However, as described above, the reservation for the valet parking is arbitrary. When the customer 30 transmits reservation information, the authentication server 10 registers the reservation information in the reservation information database 24 (step S122).

When the customer 30 wants to use the valet parking to make the vehicle 52 enter the parking place 50, the customer 30 looks for the attendant 40 and requests to use the valet parking. At this time, the customer 30 operates the customer terminal 32 and transmits a trigger signal from the customer terminal 32 to the authentication server 10 (step S113). The trigger signal is a signal to require the provision of the valet parking service. When the reservation for the valet parking has been made in advance, the trigger signal containing a signal to identify the reservation is transmitted.

The authentication server 10 receives the trigger signal transmitted from the customer terminal 32 (step S123). In response to receipt of the trigger signal, the authentication server 10 generates the random passcode and registers the generated passcode in the passcode database 22 as first identification information (step S124). Here, it is assumed that the passcode is a PIN having a predetermined number of digits. The authentication server 10 transmits the generated passcode to the customer terminal 32 (step S125).

The customer terminal 32 receives the passcode transmitted by the authentication server 10 (step S114). The customer terminal 32 displays the received passcode on the screen (step S115). The display of the passcode on the screen may be performed automatically by the customer terminal 32 in response to receipt of the passcode or may be accompanied by the operation of the customer terminal 32 by the customer 30. The customer 30 shows the passcode displayed on the screen of the customer terminal 32 to the attendant 40 (step S116).

The attendant 40 visually confirms the passcode shown by the customer 30 (step S131). Then, the attendant 40 manually inputs the confirmed passcode into the attendant terminal 42 (step S132). The attendant terminal 42 where the attendant 40 inputs the passcode is required to be a registered terminal which is vested with authority to access the authentication server 10. In response to connection of the attendant terminal 42 to the authentication server 10, the attendant 40 operates the attendant terminal 42 and transmits the input passcode from the attendant terminal 42 to the authentication server 10 (step S133).

The authentication server 10 receives the passcode transmitted from the attendant terminal 42 as second identification information (step S126). The authentication server 10 collates the passcode received from the attendant terminal 42, that is, the second identification information, with the passcode transmitted to the customer terminal 32, that is the first identification information, using the passcode database 22 (step S127).

In response to equality between the first identification information and the second identification information as a result of the collation, the authentication server 10 transmits authentication notice to the customer terminal 32 (step S128). The authentication server 10 also transmits the authentication notice to the attendant terminal 42 in response to equality between the first identification information and the second identification information (step S129). When the reservation information previously transmitted from the customer 30 is registered in the reservation information database 24 and the reservation information includes the desired service, the authentication server 10 transmits the authentication notice including the desired service.

The customer terminal 32 receives the authentication notice transmitted from the authentication server 10 (step S117). The attendant terminal 42 also receives the authentication notice transmitted from the authentication server 10 (step S134). Since both the customer terminal 32 and the attendant terminal 42 receive the authentication notice, the customer 30 and the attendant 40 can verify each other's authenticity. In particular, the customer 30 can deposit the vehicle 52 with the attendant 40 with peace of mind verifying that the attendant 40 in front of the customer 30 is authentic. When depositing the vehicle 52, a physical key may be given to the attendant 40, or a virtual key may be issued and downloaded on-line to the attendant terminal 42.

When the authentication notice includes the desired service, the service desired by the customer 30 such as refueling in the vehicle or washing the vehicle is provided for the vehicle 52 by the attendant 40 or another person in charge. When the authentication notice does not include the desired service, the vehicle 52 deposited by the customer 30 is made to enter the parking place 50 as it is.

Figure 3:
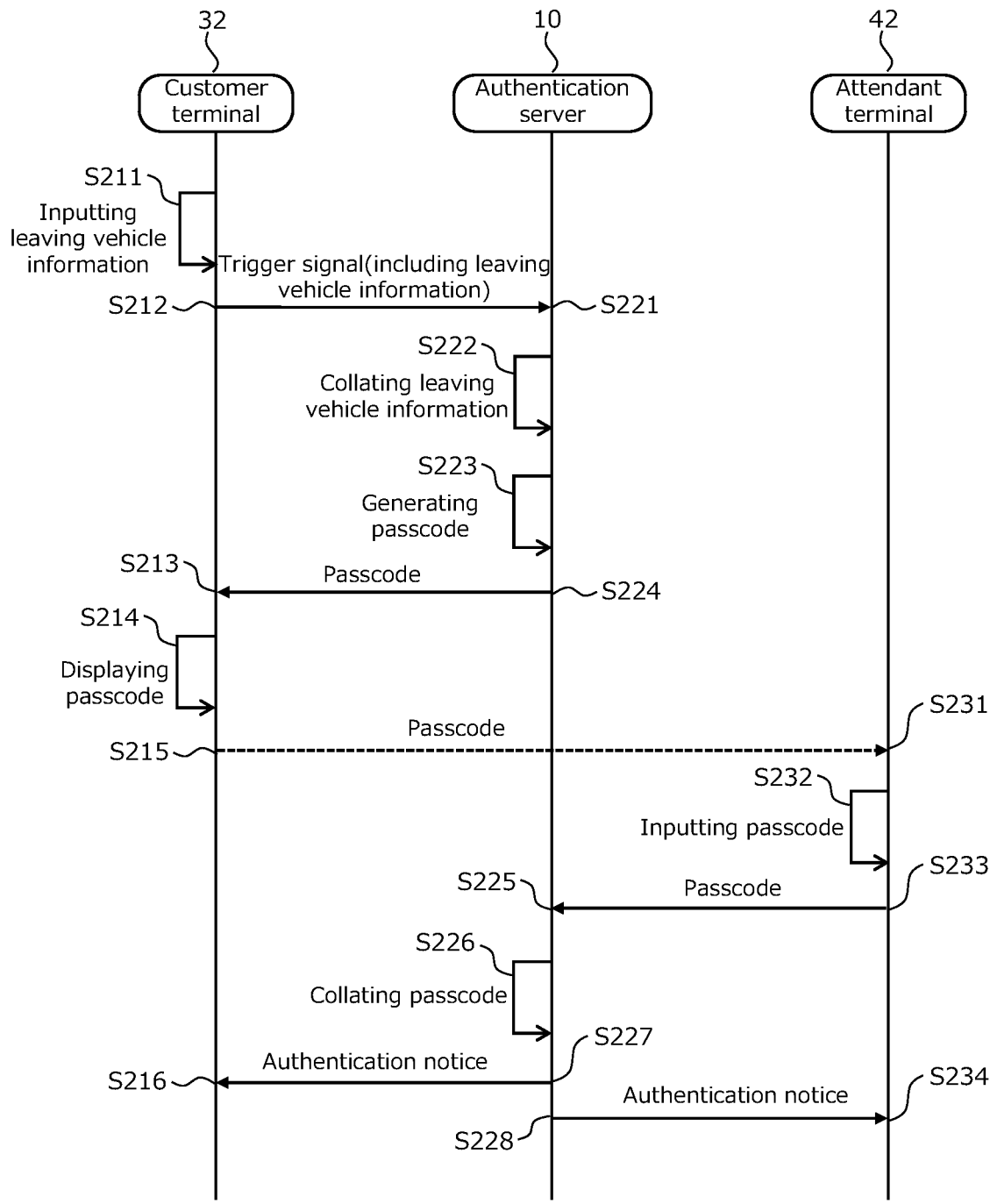
FIG. 3 is a flowchart illustrating a process of an authentication method performed at the time of leaving of a vehicle by valet parking in the embodiment of the present disclosure.

2-2. Process of Authentication Method by Valet Parking Performed at Time of Vehicle Leaving FIG. 3 is a flow chart illustrating the process of the authentication method performed by the authentication system 2 at the time of vehicle leaving by the valet parking. When the customer 30 wants to use the valet parking to make the vehicle 54 leave the parking place 50, the customer 30 inputs the leaving vehicle information, which is information about the vehicle 54 desired to leave, into the customer terminal 32 (step S211).

The leaving vehicle information input by the customer 30 is information which specifies at least the vehicle 54 desired to leave and which proves the qualification to request the leaving of the vehicle 54. It may be information such as a registration number of the vehicle, customer ID, and a passcode, for example. The customer ID may be, for example, an expired ID given to the customer terminal 32 by the authentication server 10 after entry. The passcode may be a passcode provided at the time of entry or may be newly given to the customer terminal 32 by the authentication server 10 after entry.

The customer 30 looks for the attendant 40 to require the use of the valet parking and transmits the trigger signal to the authentication server 10 from the customer terminal 32 (step S212). The trigger signal is a signal to require the provision of the valet parking service. The customer terminal 32 transmits the trigger signal including the leaving vehicle information input by the customer 30.

The authentication server 10 receives the trigger signal transmitted from the customer terminal 32 (step S221). The authentication server 10 collates the stored vehicle information registered in the stored vehicle information database 26 with the leaving vehicle information included in the trigger signal (step S222). That is, the authentication server 10 verifies whether the customer 30, who transmitted the trigger signal, is qualified to make the vehicle 54 leave.

If the customer 30 is qualified to make the vehicle 54 leave, the authentication server 10 generates a random passcode and registers the generated passcode as the first identification information in the passcode database 22 (step S223). Here, it is assumed that the passcode is a PIN having a predetermined number of digits. The authentication server 10 transmits the generated passcode to the customer terminal 32 (step S224).

The customer terminal 32 receives the passcode transmitted from the authentication server 10 (step S213). The customer terminal 32 displays the received passcode on the screen (step S214). Displaying the passcode on the screen may be performed automatically by the customer terminal 32 in response to receipt of the passcode or may be accompanied by the operation of the customer 30. The customer 30 shows the passcode displayed on the screen of the customer terminal 32 to the attendant 40 (step S215).

The attendant 40 visually confirms the passcode shown by the customer 30 (step S231). Then, the attendant 40 manually inputs the confirmed passcode into the attendant terminal 42 (step S232). However, same as the time of entry, the attendant terminal 42, where the attendant 40 inputs the passcode, is required to be a registered terminal which is vested with authority to access the authentication server 10. In response to connection of the attendant terminal 42 to the authentication server 10, the attendant 40 operates the attendant terminal 42 and transmits the input passcode from the attendant terminal 42 to the authentication server 10 (step S233).

The authentication server 10 receives the passcode transmitted from the attendant terminal 42 as the second identification information (step S225). The authentication server 10 collates the passcode received from attendant terminal 42, that is the second identification information, with the passcode transmitted to the customer terminal 32, that is, the first identification information, using the passcode database 22 (step S226). In response to equality between the first identification information and the second identification information as a result of the collation, the authentication server 10 transmits the authentication notice to the customer terminal 32 (step S227). In addition, in response to equality between the first identification information and the second identification information, the authentication server 10 also transmits the authentication notice to the attendant terminal 42 (step S228).

The customer terminal 32 receives the authentication notice transmitted from the authentication server 10 (step S216). The attendant terminal 42 also receives the authentication notice transmitted from the authentication server 10 (step S234). Since both the customer terminal 32 and the attendant terminal 42 receives the authentication notice, the customer 30 and the attendant 40 can verify each other's authenticity. In particular, the attendant 40 can return the vehicle 54 to the customer 30 with peace of mind verifying that the customer 30 in front of the attendant 40 is authentic.

3. OTHER EMBODIMENTS

While in the above-described embodiment, the technique of the present disclosure is applied to the valet parking service at the airport, the technique of the present disclosure may be applied to a valet parking service at various facilities including hotels and restaurants other than the airport.

Further, the technique of the present disclosure is also applicable to authentication of a customer and an attendant in a case of a vehicle repair service. In a case of the repair service, the vehicle is deposited with the attendant by the customer, and the vehicle is managed in a repair shop until the repair is done. Then, after the repair is done, the vehicle is returned to the customer from the attendant. The technique of the present disclosure may be applied to authentication when the customer deposits the vehicle with the attendant and authentication when the attendant returns the vehicle to the customer.

In addition, the technique of the present disclosure is also applicable to authentication of a customer and an attendant in a case of a rental car service. While the valet parking service and the repair service are services involving the management of a vehicle deposited by a customer, a rental car service is a service where a customer is responsible for the management of a vehicle. In a case of the rental car service, a vehicle is lent to a customer by an attendant, and the vehicle is managed by the customer until it is returned. Then, the vehicle is returned to the attendant by the customer when the customer has finished using the vehicle. The techniques of the present disclosure may be applied to authentication when the attendant lends the vehicle to the customer and authentication when the customer returns the vehicle to the attendant.

While every service exemplified above is a service involving the movement of management responsibility for a vehicle, the technique of the present disclosure is widely applicable to authentication of a customer and an attendant in various services. According to the technique of the present disclosure, when the same information as the first identification information displayed on the customer terminal is input into the attendant terminal as the second identification information, the authentication notice is transmitted to both the customer and the attendant. Upon this authentication notice, the customer who intends to receive the service can verify whether an attendant to take charge of the customer is the authentic attendant. On the other hand, the attendant required to provide the service can verify whether a customer of whom the attendant intends to take charge is the authentic customer. Additionally, in this description, a service includes purchase and sale of goods. In this description, the customer is the recipient of the service, and the attendant includes the provider itself of the service.

What is claimed is:

1. An authentication method for authenticating a customer who intends to receive a service and an attendant in charge of the customer using a server configured to communicate with a customer terminal possessed by the customer and an attendant terminal possessed by the attendant, the authentication method comprising:
    transmitting a trigger signal from the customer terminal to the server;
    transmitting first identification information from the server to the customer terminal in response to transmission of the trigger signal from the customer terminal;
    displaying the first identification information transmitted from the server on the customer terminal;
    accepting input of second identification information into the attendant terminal;
    transmitting the second identification information input into the attendant terminal from the attendant terminal to the server;
    collating the second identification information transmitted from the attendant terminal with the first identification information transmitted to the customer terminal; and
    transmitting authentication notice to the customer terminal and the attendant terminal from the server in response to equality between the first identification information and the second identification information,
    wherein the customer terminal is a first terminal, wherein the attendant terminal is a second terminal that is pre-registered to the server and vested with authority to access the server as an attendant, and wherein access to transmit identification information to the server is restricted to only the attendant terminal from among the attendant terminal and the customer terminal.

2. The authentication method according to claim 1, wherein the authentication notice transmitted to the attendant terminal includes reservation information for the service registered by the customer in advance.

3. The authentication method according to claim 1, wherein the service is a service involving management of a vehicle deposited by the customer, and wherein the attendant is an attendant who handles the vehicle when providing the service.

4. The authentication method according to claim 3, wherein the service is a valet parking service.

5. The authentication method according to claim 1, wherein the first identification information is a plurality of letters or numbers or a combination thereof which are randomly determined, and wherein the second identification information is a plurality of letters or numbers or a combination thereof which can be input arbitrarily.

6. The authentication method according to claim 1, wherein access to the server is restricted to registered attendant terminals that pre-register respective unique terminal identifiers.

7. The authentication method according to claim 1, wherein access to the server is restricted to registered attendant terminals that pre-register respective MAC addresses.

8. An authentication server for authenticating a customer who intends to receive a service and an attendant in charge of the customer, the authentication server comprising:

at least one memory storing at least one program; and at least one processor coupled with the at least one memory, wherein the at least one program is configured to cause the at least one processor to execute:

receiving a trigger signal from a customer terminal possessed by the customer;

transmitting first identification information to the customer terminal in response to the trigger signal;

receiving second identification information from an attendant terminal possessed by the attendant;

collating the second identification information received from the attendant terminal with the first identification information transmitted to the customer terminal; and transmitting authentication notice to the customer terminal and the attendant terminal in response to equality between the first identification information and the second identification information, wherein the customer terminal is a first terminal, wherein the attendant terminal is a second terminal that is pre-registered to the server and vested with authority to access the server as an attendant, and wherein access to transmit identification information to the server is restricted to only the attendant terminal from among the attendant terminal and the customer terminal.

9. A non-transitory computer-readable storage medium storing an authentication program for causing a computer to authenticate a customer who intends to receive a service and authenticate an attendant in charge of the customer, the authentication program configured to cause the computer to execute:

receiving a trigger signal from a customer terminal possessed by the customer;

transmitting first identification information to the customer terminal in response to the trigger signal;

receiving second identification information from an attendant terminal possessed by the attendant;

collating the second identification information received from the attendant terminal with the first identification information transmitted to the customer terminal; and transmitting authentication notice to the customer terminal and the attendant terminal in response to equality between the first identification information and the second identification information, wherein the customer terminal is a first terminal, wherein the attendant terminal is a second terminal that is pre-registered to the server and vested with authority to access the server as an attendant, and wherein access to transmit identification information to the server is restricted to only registered the attendant terminal from among the attendant terminal and the customer terminal.

* * * * *